Sept. 30, 1947.　　　A. MONTANI　　　2,428,122
OPTICAL PROJECTING LENS SYSTEM
Filed Feb. 24, 1945
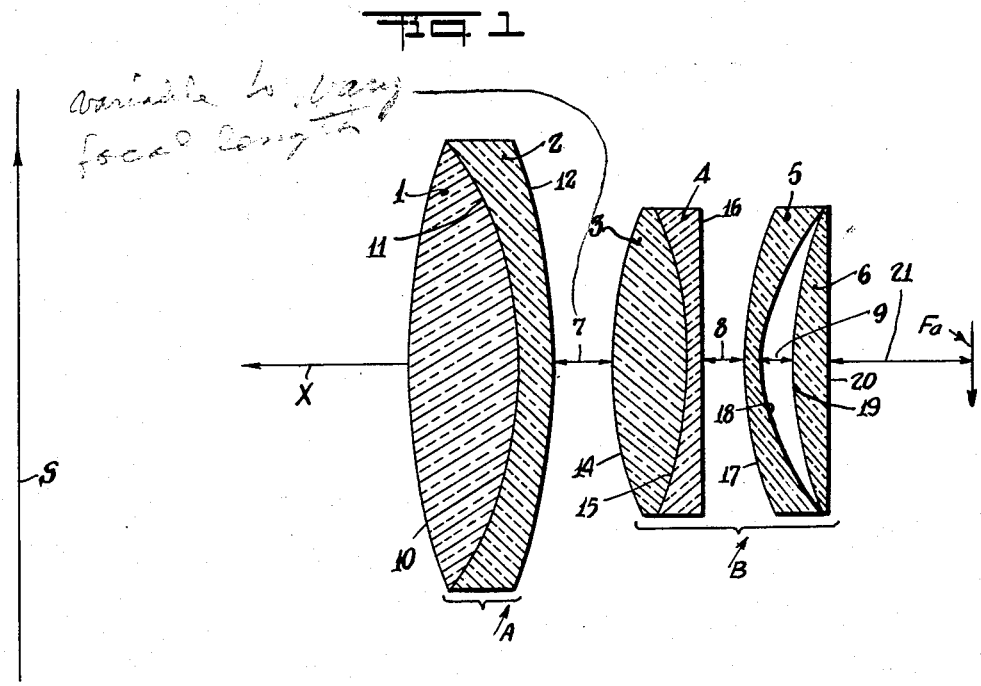
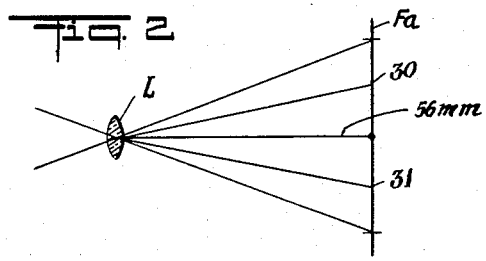
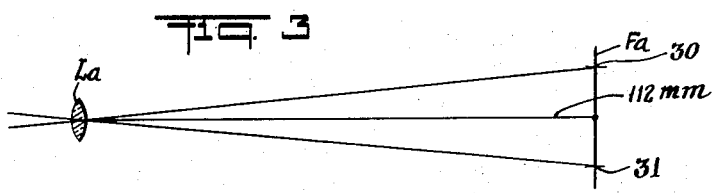
INVENTOR.
Angelo Montani
BY
Mock + Blum
ATTORNEYS Patented Sept. 30, 1947

2,428,122

UNITED STATES PATENT OFFICE 2,428,122

OPTICAL PROJECTING LENS SYSTEM

Angelo Montani, New York, N. Y., assignor of one-half to Peter Tames, New York, N. Y.

Application February 24, 1945, Serial No. 579,509

2 Claims. (Cl. 88—57)

My invention relates to a new and improved optical projecting system.

One of the objects of my invention is to provide a system whereby the magnification of the image on the screen can be increased, without shifting the screen and the projector relative to each other.

Another object is to provide an improved motion picture projector, whereby the size of the normal image on the screen can be linearly varied up to twice the linear dimension of the projected image which can be secured for the respective projection distance. This is particularly useful in projecting 35 mm. motion picture film, because a greatly enlarged image of a frame or frames can be projected, without shifting the projector relative to the screen. It is also useful in projecting 16 mm. film or any picture or object.

Other important advantages and objects of my invention will be stated in the annexed description and drawings, which disclose an illustrative embodiment of my invention, and its theory of operation.

Fig. 1 shows a lens system which is made according to my invention.

Figs. 2 and 3 show the decrease in the angle of the field of the improved lens system, as its effective or equivalent focal length is increased.

As an illustration of my invention, this embodiment applies to a projector for 35 mm. film, but the invention is not limited thereto.

The complete lens system comprises three doublets, namely, the front doublet 1—2 and the two additional doublets 3—4 and 5—6. The front doublet 1—2 is designated as the front combination or first combination A of the complete lens system. The doublets 3—4 and 5—6 comprise the rear or second combination B of the complete lens system A—B.

If two combined respective simple and thin lenses have the respective equivalent focal lengths $f_1$ and $f_2$, and the distance $d$ between the two lenses is appreciable, the equivalent focal length F of such lens combination, as stated on page 25 of "Fundamentals of Optical Engineering" by Jacobs, published in 1943 by McGraw Hill Book Co. Inc., is $$F = \frac{f_1 f_2}{f_1 + f_2 - d}$$

In the above equation, $d$ is the distance between the two simple, thin lenses, measured along the common optical axis of the two lenses. Hence, the resultant equivalent focal length F is modified when said distance $d$ is modified.

In order to correct chromatic aberration and the Seidel aberrations said two thin lenses in said simple two-lens combination are replaced by three pairs of lenses, in the improved system, to provide two lens combinations A and B.

The five Seidel aberrations are defined on pp. 303–305 of "Applied Optics and Optical Design" by Conrady, published in 1929 by Oxford University Press. These Seidel aberrations include spherical aberration.

That is, one of the simple, thin lenses in said equation is represented by the doublet 1—2. The other simple, thin lens in said equation is represented by the combination B of the two doublets 3—4 and 5—6. The distance $d$ in said equation, is the distance 7 between the adjacent surfaces of lenses 2 and 3, measured along the common optical axis X of all the lenses 1, 2, 3, 4, 5 and 6.

Assuming that the lens combination A is corrected separately for chromatic aberration and the Seidel aberrations, and assuming that the combination B is corrected separately for chromatic aberration and the Seidel aberrations, then the complete assembled system A—B is not necessarily corrected for chromatic aberration and the Seidel aberrations. To correct the complete system A—B, it is necessary to establish a certain relationship between the various factors, namely, the respective distances 7, 8 and 9, the thicknesses of the lenses 1, 2, 3, 4, 5, 6 along the axis X, the curvatures of the surfaces of the lenses, and the indexes of refraction and dispersion of the respective materials of said lenses 1, 2, 3, 4, 5, 6.

The lens 1 is a convex lens, which has the respective convex surfaces 10 and 11. The lens 2 has a rear convex surface 12, and a front concave surface which is coincident with the convex surface 11 of lens 1. These lenses 1 and 2 are cemented to each other, in order to form the cemented doublet A. This doublet A is positive.

The lenses 3 and 4 are also a cemented doublet. Lens 3 has respective convex surfaces 14 and 15. Lens 4 has a rear planar surface 16, and a front surface which is coincident with surface 15. The layers of cement in said cemented doublets are so thin that they can be disregarded.

The lenses 5 and 6 are a non-cemented doublet. Lens 5 has a front convex surface 17 and a rear concave surface 18. Lens 6 has a convex surface 19 and a rear planar surface 20. Along the optical axis X of the lenses 1—6 inclusive, the surfaces 18 and 19 are separated by a fixed distance 9. The space between surfaces 18 and 19 is an air space. Lenses 5 and 6 are held so that they abut at their edges, in a suitable tube or other holder. The lenses 3 and 4 are also fixed in said tube or holder, so that the doublets 3—4 and 5—6 are shifted in unison longitudinally along optical axis X, relative to doublet 1—2, in order to increase or decrease the length of the spacing 7, while the distance 8 between doublets 3—4 and 5—6 remains fixed. The distance 9 also remains fixed. Such holder is not shown in the drawings, because it is old and well-known per se. Hence the doublets 3—4 and 5—6 are held fixed relative to each other, when the projector is adjusted. The only adjustment in the system A—B is to increase or decrease the length of the distance $d$ or 7. The lens combination B is also positive.

When the distance 7 is a minimum, the equivalent focal length F of the system A—B is a minimum, and the angle of the field which is covered by the complete lens system A—B is a maximum, as shown in Fig. 2. As the distance 7 is increased from its minimum value, the angle of the field decreases, and the equivalent focal length F of the entire optical system A—B of the three doublets increases, as shown in Fig. 3.

The lens elements of the improved complete lens system are designed and located, so as to compensate for the variation of the chromatic and Seidel aberrations which are caused by the variation in distance 7. The improved lens system A—B is designed to project black-and-white pictures and colored pictures.

Each of the doublets 1—2, 3—4, and 5—6 is individually chromatically corrected, by selecting different glasses for the lenses of each said doublet, said glasses having suitable relative indices of dispersion. This correction is visual.

As previously mentioned, the doublets 1—2 and 3—4 are respective cemented doublets. The cementing medium may be of any suitable known type. The respective glass compositions of the lenses of said cemented doublets are selected, so as to reduce the spherical aberration in each said cemented doublet 1—2 and 3—4. A small residual positive spherical aberration is purposely retained in said cemented doublets 1—2 and 3—4, in order to correct the coma which results from the increase in distance 7 from its minimum value. The coma is one of the Seidel aberrations. Coma is the aberration which affects only image points off the optical axis. The conditions of coma are stated on pp. 414-419 of "Fundamentals of Optical Engineering" and chapters VI and VII of the text by Conrady.

As previously mentioned, the doublet 5—6 is non-cemented, and the curvatures of the surfaces of the lenses of said doublet 5—6 and the respective indices of refraction of the respective glasses of the lenses of said doublet 5—6 are selected so as to produce a negative spherical aberration.

That is, in positive spherical aberration, the rays which pass through the lens close to its periphery, are focused on the optical axis of the lens, nearer to the lens, than rays which pass through the lens, close to the centre of the lens. In negative spherical aberration, the lens is overcorrected for said spherical aberration. Hence, in an over-corrected lens, the peripheral rays will focus on the optical axis of the lens, further away from the lens than the rays which pass through the lens close to its centre.

When said three doublets 1—2, 3—4, 5—6 are located so that the distance 7 is a minimum of 0.5 mm. in this example, and the fixed axial distance 8 between surfaces 16 and 17 is 10.3 mm., and the fixed axial distance 9 between surfaces 18 and 19 is 3.2 mm., the entire optical system A—B is corrected sufficiently against spherical aberration so that this aberration is not objectionable. This correction results from the reciprocal compensation of doublets 1—2, 3—4, and 5—6.

That is, the doublets 1—2 and 3—4 have residual positive spherical aberration, which is sufficiently compensated by the negative spherical aberration of the doublet 5—6, so that when the distance 7 is a minimum of 0.5 mm., in this example, the maximum angle of field of the system A—B, which is shown in Fig. 2, is substantially free from spherical aberration, and therefore substantially free from the other Seidel aberrations. When the distance 7 is increased from said minimum, there is a decrease in the angle of the field of the system A—B, which remains free from spherical aberration. That is, as the distance 7 is increased, a part of the periphery of the field which is free from spherical aberration when distance 7 is said minimum, now has positive spherical aberration.

The distance 7 is increased from said minimum value in regulating the projecting system A—B, and said distances 8 and 9 remain fixed at the respective values of 10.3 and 3.2 mm., when distance 7 is varied.

As the distance 7 is thus varied by increasing it from said minimum value of 0.5 mm., the uncemented doublet 5—6 optically nears the focal plane Fa of the adjusted system A—B.

That is, when the distance 7 is 0.5 mm., the equivalent focal length of the system A—B is 56 mm. Under such conditions, the back focal length 21, which is the distance from surface 20 to the point at which parallel rays which pass through the system A—B will converge, is 31.2 mm. When the equivalent focal length is 112 mm., the back focal length 21 is 8.5 mm. The plane defined as Fa is the focal plane of the system A—B.

The plane S indicates the projection plane, in which the image of the object is projected. The distance 7 is increased from its minimum value by moving combination A towards the projection plane S, or by moving the combination B towards the focal plane Fa. This increases the equivalent focal length F of the entire system A—B.

When the focal length F of the entire optical system A—B is thus increased, the back focal length 21 of the entire optical system A—B is decreased.

As the equivalent focal length F of the entire system is thus increased, the correcting effect of doublet 5—6 for spherical aberration is decreased, thus increasing the positive spherical aberration of the entire system.

When the distance 7 is a minimum, there is minimum and very slight spherical aberration in that part of the field which is close to the axis X. The spherical aberration increases towards the periphery of the field, but it is so small that it is unobjectionable, under thhe conditions stated herein.

As the distance 7 is increased, thus increasing the equivalent focal length F, the spherical aberration increases in the entire field, and such increase is greatest at the marginl portion of the field. One of the objects of my invention is to cut off said marginal portion, in which the increased spherical aberration is objectionable.

Figs. 2 and 3 illustrate the theory and operation of my system. In Fig. 2, the lens system A—B is replaced by a single thin simple lens L, which has a focal length of 56 mm., corresponding to the minimum equivalent focal length F of the system A—B.

In Fig. 3, the thin simple lens L has a focal length of 112 mm., corresponding to the maximum equivalent focal length F of the system A—B. The top and bottom of the frame are defined by the point 30 and 31. Fig. 3 shows that the angle of the field is diminished, as the equivalent focal length is increased, thus progressively eliminating the part of the field which otherwise would have objectionable spherical aberration.

The effect is the same as though the diameter of lens 3, as viewed through doublet 1—2, is diminished as the equivalent focal length F is increased.

The effective diameter of lens 3, as viewed or projected through doublet 1—2 is, in effect, the effective diameter of a stop of the lens system A—B. This variation of the effective diameter of the aperture stop, corrects the coma which results from said increasing spherical aberration. This is equivalent to the stop-shift method of removing coma.

As the distance 7 is increased from 0.5 mm. to 95.3 mm., the equivalent focal length F of the entire optical system A—B is varied from a minimum value of 56 mm. to 112 mm.

The diameter of the first doublet 1—2 is 55 mm., and the diameter of the doublets 3—4 and 5—6 is 41 mm. This refers to the dimensions of the respective lenses, in a direction perpendicular to optical axis X.

The image on screen S is inverted relative to the object in the plane Fa.

The respective central thickness of each lens, along optical axis X, is as follows:

*Table 1*

| Lens | Central Thickness |
|---|---|
| | Mm. |
| 1 | 14.2 |
| 2 | 2.8 |
| 3 | 9.8 |
| 4 | 1.8 |
| 5 | 1.8 |
| 6 | 5.9 |

The index of refraction of each lens, taken at the sodium D line, and the respective Abbe numbers, are as follows:

*Table 2*

| Lens | Index | Abbe number |
|---|---|---|
| 1 | 1.517 | 64.5 |
| 2 | 1.617 | 36.6 |
| 3 | 1.523 | 58.8 |
| 4 | 1.621 | 36.2 |
| 5 | 1.583 | 46.0 |
| 6 | 1.523 | 58.8 |

The Abbe number is defined on page 92 of "Fundamentals of Optical Engineering."

The radius of curvature of each respective surface of the respective lenses is as follows:

*Table 3*

| Surface | Radius of Curvature |
|---|---|
| 10 | plus 72.5 mm. |
| 11 | minus 63.6 mm. |
| 12 | minus 427.7 mm. |
| 14 | plus 56.2 mm. |
| 15 | minus 47.9 mm. |
| 16 | infinity. |
| 17 | plus 44.9 mm. |
| 18 | plus 28.2 mm. |
| 19 | plus 41.9 mm. |
| 20 | infinity. |

It is possible to increase the linear dimensions of the image on screen S, to at least twice normal size, without shifting the projector relative to screen S.

From the above specific example, the values of the system can be readily calculated for projecting objects other than the frames of 35 mm. film.

An essential principle of the system is as follows:

I provide a lens system whose equivalent focal length can be increased from a predetermined minimum to a predetermined maximum. At such predetermined minimum, the entire field is substantially free from chromatic aberration and other Seidel aberrations. As I increase the equivalent focal length and thus decrease the size of the projected image, I increase the spherical aberration, but I simultaneously correct the resultant coma by shifting the aperture stop of the system, said aperture stop being the diameter of the lens 3. In another aspect of my invention, I decrease the subtended field as the equivalent focal length is increased, thus cutting off the marginal portion of the field in which the spherical aberration is objectionably increased.

I thus increase the size of the projected image, with unobjectionable increase in spherical aberration.

For the purposes of the claims, the spherical aberration of the lens system is designated as being substantially zero when the equivalent focal length is a predetermined minimum, which means that said spherical aberration is then unobjectionable to the observer. As thus defined, the spherical aberration remains substantially zero as the equivalent focal length is increased, because the marginal portion of the field is progressively cut off as the equivalent focal length is increased.

In the preferred system disclosed herein, the marginal portion of the field is thus progressively cut off as the equivalent focal length is increased, by the change in the longitudinal spacing of the lenses from each other and from the object.

In the preferred embodiment, there are two lens combinations A and B. This provides a very simple system, in which the only adjustment is to adjust the length of the distance 7.

In this embodiment, the effective focal length of the lens system is increased from a predetermined minimum, to twice said predetermined minimum, while avoiding objectionable spherical aberration. However, the invention is not limited to this ratio.

From the figures previously stated, it follows that the focal length of the front lens combination A is about 75% of the focal length of the rear lens combination B. Likewise, the focal length of the front lens combination A is about 133% of the maximum length to which the variable focal length of the entire system A—B can be adjusted.

For convenience, the double 1—2 is designated as the front doublet, the doublet 3—4 is designated as the intermediate doublet, and the doublet 5—6 is designated as the rear doublet.

Numerous changes and omissions and additions can be made in and to the disclosure herein, without departing from the scope of the invention.

I claim:

1. A lens system of variable focal length, said system consisting wholly of a front lens combination and a rear lens combination, each said combination consisting of a plurality of lenses, said combinations having a common optical axis, the lenses of each combination being fixed relative to each other, said combinations being movable relative to each other along said optical axis to vary the focal length of said system solely by varying the length of the distance between said combinations, each said lens combination being positive and achromatic, the focal length of the front lens combination being less than the focal length of the rear lens combination and being greater than the maximum focal length of said system, said front lens combination consisting of a front lens and a rear lens, the rear wall of said front lens and the front wall of said rear lens being of identical shape and abutting each other, said rear lens combination consisting of two rear lenses and two intermediate lenses, said two intermediate lenses being located intermediate said front combination and said two rear lenses, said two intermediate lenses having their adjacent walls abutting each other and of identical shape, said two intermediate lenses being a positive achromatic doublet, said front lens combination and said two intermediate lenses having combined positive spherical aberration, said two rear lenses having adjacent walls of different shapes and which are spaced from each other at said axis, said two rear lenses having negative spherical aberration which substantially corrects said positive spherical aberration in the range of variation of said focal length.

2. A six-lens system of variable focal length, said system consisting wholly of a front lens combination and a rear lens combination, said front lens combination consisting of two lenses, the rear wall of the front lens of said front lens combination substantially abutting the front wall of the rear lens of the front lens combination to provide a front common surface, said rear lens combination consisting of four lenses which are arranged in a front pair and a rear pair, the rear wall of the front lens of said front pair substantially abutting the front wall of the rear lens of said front pair to provide a rear common surface, the rear wall of the front lens of said rear pair being of different curvature than the front wall of the rear lens of said rear pair, said combination having ten surfaces transverse to the common optical axis of said lenses, the lenses of each combination being fixed relative to each other, said combinations being movable relative to each other along said optical axis to vary the focal length of said system solely by varying the length of the axial distance between said combinations, each said lens combination being positive and achromatic, the focal length of the front lens combination being less than the focal length of the rear lens combination and being greater than the maximum focal length of said system, the central thicknesses of said six lenses along said optical axis, from front to rear, being substantially in the relation of 14.2 mm.—2.8 mm.—9.8 mm.—1.8 mm.—1.8 mm.—5.9 mm.; the respective indices of refraction of said six lenses, from front to rear, being substantially in the relation of 1.517—1.617—1.523—1.621—1.583—1.523; the respective Abbe numbers of said six lenses, from front to rear, being substantially in the relation of 64.5—36.6—58.8—36.2—46.0—58.8; the respective radii of curvature of said ten surfaces, from front to rear, being substantially in the relation of plus 72.5 mm.—minus 63.6 mm.—minus 427.7 mm.—plus 56.2 mm.—minus 47.9 mm.—infinity—plus 44.9 mm.—plus 28.2 mm.—plus 41.9 mm.—infinity.

ANGELO MONTANI.

REFERENCES CITED

The following references are of record in the file of this patent:

UNITED STATES PATENTS

| Number | Name | Date |
| --- | --- | --- |
| 1,988,390 | Naumann | Jan. 15, 1935 |
| 212,099 | Knapp | Feb. 11, 1879 |
| 2,159,394 | Mellor et al. | May 23, 1939 |
| 1,947,669 | Warmisham et al. | Feb. 20, 1934 |
| 2,042,815 | White | June 2, 1936 |
| 1,898,471 | Walker | Feb. 21, 1933 |
| 1,897,262 | Kitroser | Feb. 14, 1933 |